May 21, 1929.   R. BOLLHEIMER ET AL   1,713,991
TRACTOR WINCH
Filed Aug. 29, 1927    2 Sheets-Sheet 1

Inventors
Rhinehard Bollheimer
Edward T. Wilkens
George R. Harris
by their Attorney
William R. Pratt Inventors
Rhinehard Bollheimer
Edward T. Wilkens
George R. Harris
by their Attorney
William R. Pratt Patented May 21, 1929.

1,713,991

UNITED STATES PATENT OFFICE.

RHINEHARD BOLLHEIMER, OF FORT LORAMIE, AND EDWARD T. WILKENS AND GEORGE R. HARRIS, OF TROY, OHIO.

TRACTOR WINCH.

Application filed August 29, 1927. Serial No. 216,130.

This invention relates to a form of power winch which is adapted to be mounted on a tractor of any desired type, and to be driven by power from the tractor engine under control of the operator. It is the purpose of the invention to provide a very simple and efficient mechanism of this character, which is normally held by a brake against accidental operation, but in which the brake may be released by a slight movement of an operating lever, while a further movement of the lever in the same direction will connect the winding drum of the power winch with a machine-driven part for the purpose of operating the winch. When pressure on the lever is released, it will be returned by spring to its original position. Details of the invention will be apparent from the following description and the appended claims.

Figure 1:
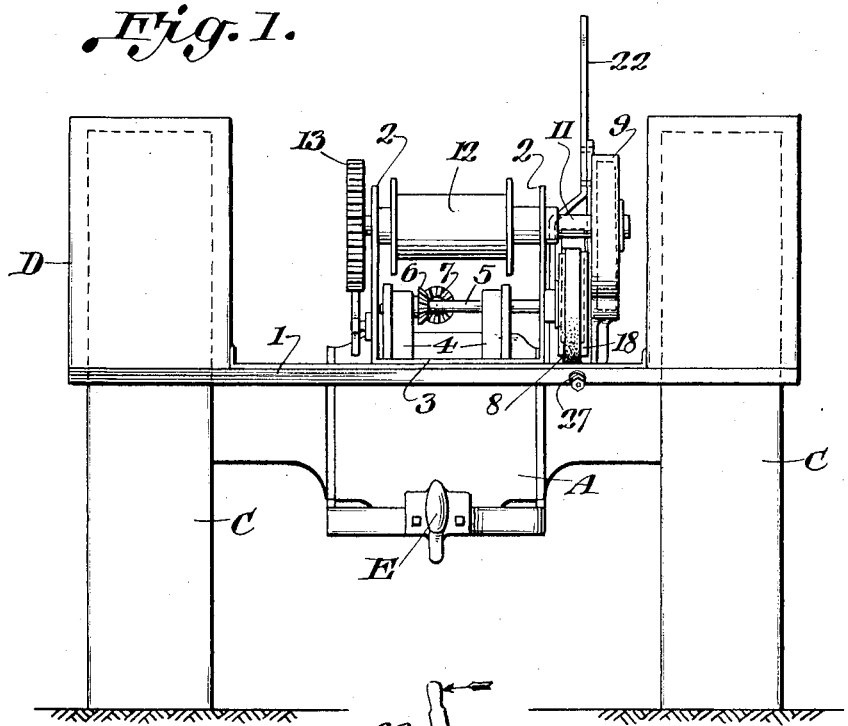
Figure 1 is a rear elevation of the invention mounted on a tractor.

The invention may be applied to any desired form of tractor, and, as illustrated, there is shown a rear portion of a conventional machine having a body A, rear axle B, rear wheels C, a housing D for said rear wheels, and other parts of the mechanism, and a draw bar E. All of these parts may be of any old or desired construction.

A supporting framework 1 extends beyond the housing for the rear wheels, and this frame carries a supporting device comprising vertical brackets 2 and a horizontal base member 3. Rising from the base member 3 are brackets 4, in which is mounted a shaft 5 carrying a pivotal gear 6 which meshes with a pivotal gear 7 on a shaft driven by the engine of the tractor in any desired manner. One end of the shaft 5 carries a fibre or similar friction wheel 8.

Figures 4, 5:
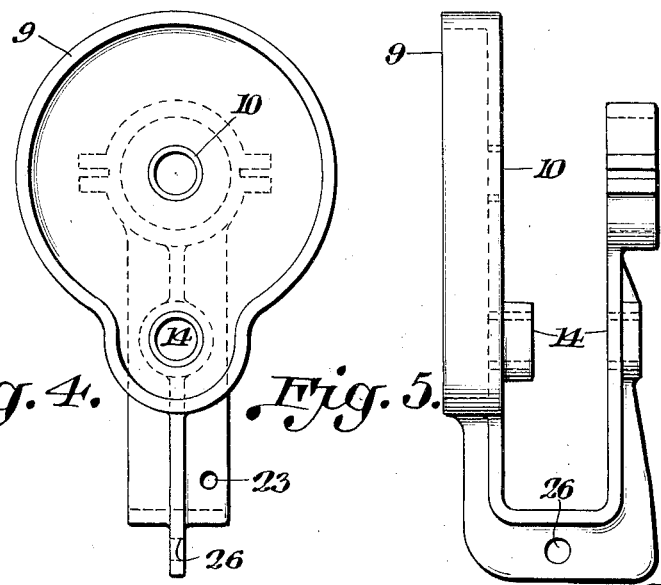
Figure 4 is a side view and Figure 5 is an end view of a supporting and operating member.

A U-shaped member 9, shown particularly in Figures 4 and 5, has bearings 10 by means of which it is mounted on one end of a shaft 11, which is mounted in the upright 2. This shaft carries a winding drum 12 and a gear 13 on the other end, but the power may be transmitted to other devices when desired. The U-shaped member 9 also has bearings 14 in which is mounted a short shaft 15 carrying a gear 16 which meshes with a larger gear 17 mounted on the shaft 11. The U-shaped member 9 is formed with a rim portion which substantially encloses and protects the gears 16 and 17. The shaft 15 also carries a friction wheel 18 which is adapted to be brought into frictional engagement with the fibre wheel 8 as hereinafter set forth.

A rod 19 is attached to a fixed portion of the framing as at 20, and pivoted thereon at 21 is a hand lever 22. The lower end of this lever is pivoted at 23 to the lower portion of the U-shaped member 9. The distance between the pivots 21 and 23 is quite short compared with the distance between the pivot 21 and the operating ends of the lever 22. A bolt or similar member 24 is also fastened to the framing at 25, and passes through an opening 26 in the lower part of the U-shaped member 9. A spring 27 surrounds the bolt 24 on the other side of the member 9 and is held in position by a nut on the lower end of this bolt.

A brake member 28 is fastened to the lever 22 at 29, and also has an end 30 engaging about a pivot at the point 23. The pivot 29 is located much further from the pivot points 21 of the lever 22 than is the pivot 23, so that a movement of the lever 22 will release the brake before producing any substantial movement of the U-shaped member 9 and the gearing carried thereby.

Figure 2:
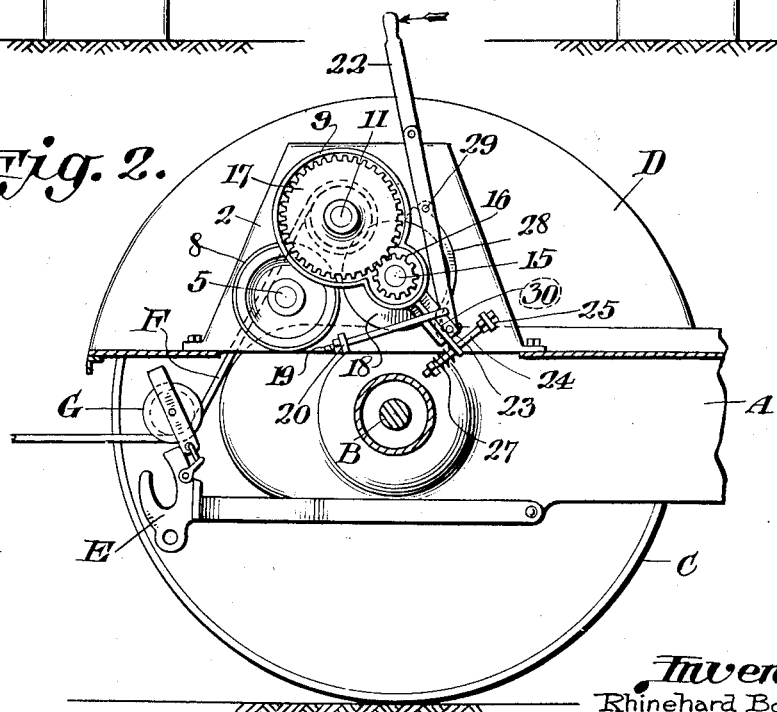
Figure 2 is a side elevation with the parts in normal position.
Figure 3:
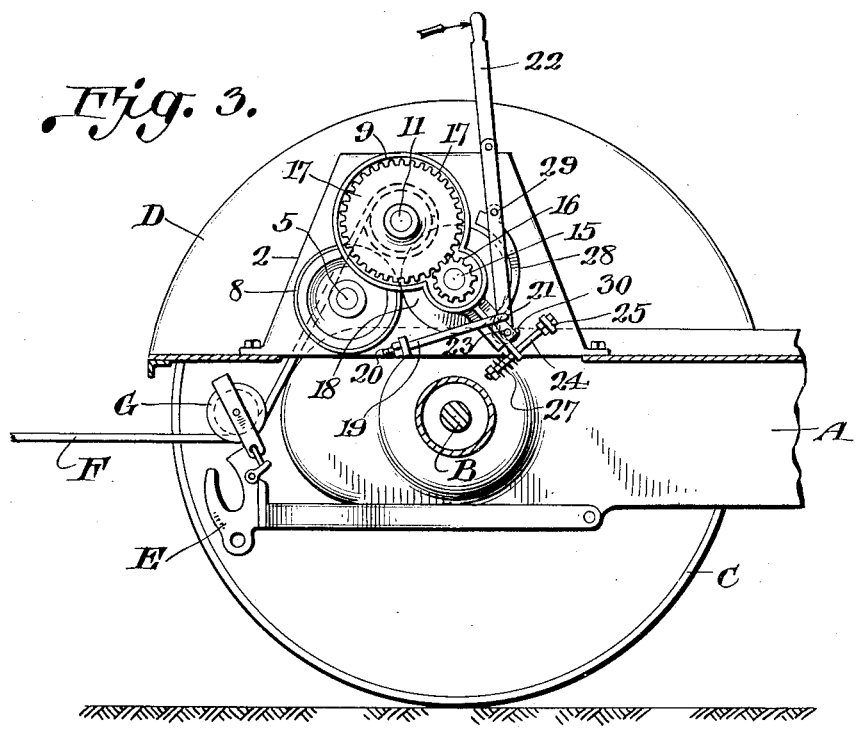
Figure 3 is a similar side elevation with the parts in operative position.

The operation of the device may be briefly described as follows. When the parts are in the position shown in Figure 2, the brake member 28 is in engagement with the friction wheel 18, and all of the parts are held against accidental movement. If it is desired merely to release the brake, the lever is given a slight movement in the direction of the arrow in Figure 3, which will release the brake, but will not bring the friction wheel 18 into contact with the wheel 8. If it is desired to wind up on the drum 12 a cable F which passes around a pulley G to any desired point, the lever 22 will be moved still further in the direction indicated in Figure 3, thus swinging the member 9 and the gears carried thereby until the friction wheel 18 engages the wheel 8 and is driven by the same. This movement will be transmitted through the shaft 15, gears 16 and 17, and shaft 11 to the winding drum 12, and the cable will be wound thereon.

When it is desired to cease the movement, it is necessary only to release the lever 22, whereupon the spring 27 will return the parts to the Figure 2 position, placing the friction wheel 18 out of contact with the wheel 8, and applying the brake member 28 with sufficient force to hold the parts against accidental movement.

It will be obvious that the invention provides a very compact and simple arrangement for obtaining the desired result, and all of the mechanism may be enclosed by a cover if desired, since it is necessary only to provide a short slot to permit movement of the lever 22 and an opening for the passage of the cable F. The construction may be modified to adapt the same for various types of tractors, and various details may be changed without departing from the spirit of the invention, which is to be regarded as limited only by the scope of the appended claims.

We claim as our invention:

1. A tractor winch comprising a friction wheel driven from a suitable source of power, a winding drum, a shaft therefor, a gear wheel on said shaft, a frame mounted to swing on said shaft, a second gear wheel meshing with the first and carried on a stub shaft mounted in said frame, a second friction wheel on said stub shaft, a brake normally engaging the second friction wheel, and a lever connected to said brake and said frame so that the movement of the lever releases the brake and brings the two friction wheels into engagement to drive the winding drum.

2. A tractor winch comprising a friction wheel driven from a suitable source of power, a winding drum, a shaft therefor, a gear wheel on said shaft, a frame mounted to swing on said shaft, a second gear wheel meshing with the first and carried on a stub shaft mounted in said frame, a second friction wheel on said stub shaft, a brake normally engaging the second friction wheel, a lever connected to said brake and said frame so that the movement of the lever releases the brake and brings the two friction wheels into engagement to drive the winding drum, and spring means for returning the lever to normal position when released.

3. A tractor winch comprising a friction wheel driven from a suitable source of power, a winding drum, a shaft therefor, a gear wheel on said shaft, a U-shaped frame mounted to swing on said shaft, a second gear wheel meshing with the first and carried on a stub shaft mounted in said U-shaped frame, a second friction wheel mounted on said stub shaft, a brake normally engaging the second friction wheel, a lever connected to said brake and to said U-shaped frame, and means for mounting said lever so that a slight movement will release the brake while a further movement is necessary to bring the two friction wheels into engagement to drive the winding drum.

In testimony whereof we affix our signatures.

RHINEHARD BOLLHEIMER.
EDWARD T. WILKENS.
GEORGE R. HARRIS.